United States Patent [19]

Hirota

[11] Patent Number: 5,294,385
[45] Date of Patent: Mar. 15, 1994

[54] METHOD OF FORMING THICK-WALLED FRONT CABINET FOR IMAGE DISPLAY DEVICE

[75] Inventor: Kashichi Hirota, Hachioji, Japan

[73] Assignee: Kyowa Electric & Chemical Co., Ltd., Tokyo, Japan

[21] Appl. No.: 873,615

[22] Filed: Apr. 22, 1992

Related U.S. Application Data

[63] Continuation of Ser. No. 534,369, Jun. 6, 1990, abandoned, which is a continuation of Ser. No. 328,131, Mar. 22, 1989, abandoned.

[30] Foreign Application Priority Data

Mar. 25, 1988 [JP] Japan ................... 63-71311

[51] Int. Cl.$^5$ ............. B29C 67/22; B29C 45/16
[52] U.S. Cl. ............... 264/45.1; 264/328.8; 264/328.12
[58] Field of Search ........... 264/328.8, 328.12, 328.1, 264/45.1

[56] References Cited

U.S. PATENT DOCUMENTS

| | | | |
|---|---|---|---|
| 3,947,175 | 3/1976 | Melcher | 264/45.1 |
| 3,972,664 | 8/1976 | Fillmann | 264/45.1 |
| 4,014,966 | 3/1977 | Hanning | 264/45.1 |
| 4,035,466 | 7/1977 | Langecker | 264/45.1 |
| 4,104,353 | 8/1978 | Monnet | 264/45.1 |
| 4,210,616 | 7/1980 | Eckardt et al. | 264/45.1 |
| 4,335,068 | 6/1982 | Hemery | 264/328.8 |
| 4,473,516 | 9/1984 | Hunerberg | 264/45.1 |
| 4,474,717 | 10/1984 | Hendry | 264/45.1 |
| 4,507,255 | 3/1985 | Shizawa | 264/45.1 |
| 4,657,496 | 4/1987 | Ozeki et al. | 264/45.1 |
| 4,670,199 | 6/1987 | Montet et al. | 264/328.8 |

FOREIGN PATENT DOCUMENTS 57-008132  1/1982  Japan ................... 264/328.1

*Primary Examiner*—Allan R. Kuhns
*Attorney, Agent, or Firm*—Frishauf, Holtz, Goodman & Woodward

[57] ABSTRACT

An injection mold for forming a thick-walled front cabinet which has a front frame panel and a cabinet portion integral with each other and which is used for an image display device containing a cathode ray tube therein. The mold has a cavity having a large depth corresponding to the large wall thickness of said cabinet, the depth of said cavity being reduced at at least a portion for forming an edge of said front frame panel contactable with said cathode ray tube, a sprue, a single runner communicating with said sprue, and a single film-type tunnel gate communicating with said runner and communicating with a portion of said cavity for forming an upper portion of said cabinet. First molten synthetic resin is first injected by a first cylinder of a sandwich injection molding machine through said tunnel gate into a portion of said cavity including said reduced depth portion. Then, second molten synthetic resin containing a blowing agent is injected by a second cylinder of the sandwich injection molding machine into said cavity through said tunnel gate. Said film-type tunnel gate may communicate with a front frame panel forming portion or a cabinet portion forming portion of the cavity.

5 Claims, 8 Drawing Sheets

METHOD OF FORMING THICK-WALLED FRONT CABINET FOR IMAGE DISPLAY DEVICE

This application is a continuation of application Ser. No. 07/534,369, filed Jun. 6, 1990, now abandoned which is a continuation of Ser. No. 07/328,131 filed Mar. 22, 1989 (now abandoned).

BACKGROUND OF THE INVENTION

1. Field of the Invention

The present invention relates to a method of forming, by injection-molding of synthetic resin, a cabinet of an image display device such as a television set, a display unit of a computer, word processor, or the like, particularly a thick-walled front cabinet having a front frame panel. The invention is also concerned with a mold for use in carrying out this method.

2. Description of the Prior Art

In general, since a front cabinet of an image display device is required to have a high level of rigidity, it has to be formed to have a large wall thickness, e.g., a wall thickness of 5 mm to 8 mm, and has to be formed from synthetic resin containing a blowing agent. In the assembly of an image display device of the type described, a cathode ray tube is mounted in the cabinet such that the front face of the cathode ray tube made of glass fits the edge defining a front opening of the front frame panel of the cabinet. The front face of the cathode ray tube, which is made of glass, tends to suffer from a dimensional error, particularly in regard to the curvature thereof. In such a case, the edge of the opening and the front face of the cathode ray tube may fail to closely fit each other, leaving a gap therebetween, if the edge defining the opening of the front frame panel of the cabinet has a large thickness, i.e., a small flexibility. This problem can be overcome by a thick-walled cabinet the thickness of which is reduced only at the edge of the front opening so as to provide a high flexibility to allow the edge to closely fit the front face of the cathode ray tube. Such a cabinet has a sufficiently high level of rigidity, while eliminating generation of any gap between the edge of the opening and the front face of the cathode ray tube.

In the prior art, such a thick-walled cabinet having a reduced wall thickness only at the edge defining the front opening of the front frame panel is produced by sandwich injection molding. The known molding system used for this purpose however employs a large number of gates, e.g., 4 gates to 10 gates, as shown in FIGS. 6 and 7 which show an injection mold according to the prior art. The structure of an injection mold according to the prior art for molding this type of cabinet, as well as the reason why a number of gates have to be employed, will be explained with reference to FIGS. 9, 10, and 11, said FIG. 11 showing a cabinet formed by using an injection mold shown in FIGS. 9 and 10.

Referring to these FIGS. 6, 7, and 8 tunnel gates 7 communicating with a sprue 70 through runners 71 have ends 72 which open to a portion of a cavity 2 for forming a front frame panel 4 of the cabinet. Usually, the opening of each gate 7 has a circular form with a diameter a of about 4 mm to 5 mm. The diameter c of each runner 71 is reduced to 1.8 mm to 2.3 mm so as to enable the portion b to be cut automatically at the time of ejection of the molded article after the mold is opened. The smaller diameter c of the runner 71 restricts the flow of molten synthetic resin so that the molten synthetic resin may fail to completely fill the cavity to its end extremity. In order to avoid this inconvenience, the mold according to the prior art employs a plurality of tunnel gates 7, 7', 7"... leading to the cavity portions 20, 21, 22, and 23 (see FIG. 6) for forming upper, lower, left and right frame portions 40, 41, 42, 43 of the front frame panel 4, as shown in FIG. 8.

In operation, the molten synthetic resin is made to flow as indicated by arrows in FIG. 6, so that weld lines 10, 10', 10"... tend to be generated at the regions where the flows of the molten synthetic resin from different gates 7, 7', 7"... meet each other, as shown in FIG. 8. Further, employment of a greater number of gates 7, 7', 7"... causes the number of the weld lines to be increased. It is proposed that generation of a large number of weld lines can be suppressed by reducing the rate of injection of the molten synthetic resin containing a blowing agent from a second cylinder of a sandwich injection molding machine so as to reduce the molding pressure. In such a case, however, gaps tend to generate in the core layer with the result that defects such as sink marks are left in the molded article.

SUMMARY OF THE INVENTION

Accordingly, it is an object of the present invention to provide a method of forming a thick-walled front cabinet for an image display device which has a front frame panel and a cabinet portion integral with each other, as well as a mold for use in carrying out the method, capable of overcoming the above-described problems of the prior art, wherein only one weld line may be formed at the bottom wall of the molded cabinet.

To this end, according to one aspect of the present invention, there is provided a method of injecting molten synthetic resin into a mold to form a thick-walled front cabinet which has a front frame panel and a cabinet portion integral with each other and which is used for an image display device containing a cathode ray tube therein, comprising the steps of: preparing an injection mold defining a cavity of a large depth corresponding to the large wall thickness of the cabinet, the depth of said cavity being reduced at at least a portion for forming an edge of said front frame panel contactable with the cathode ray tube, said injection mold having only one film-type tunnel gate communicated with a portion of said cavity for forming an upper portion of said cabinet; preparing a sandwich injection molding machine having a first cylinder and a second cylinder; injecting, by said first cylinder, first molten synthetic resin into a portion of said cavity including said reduced depth portion through said film-type tunnel gate; and injecting, by said second cylinder, second molten synthetic resin containing a blowing agent into said cavity through said film-type tunnel gate.

In a preferred embodiment of the present invention, said film-type tunnel gate may communicate with a front frame panel forming portion or a cabinet portion forming portion of the cavity.

According to the method of the present invention, the molten synthetic resin is injected through a single point provided by only one tunnel gate, so that only one weld line may be formed on the molded cabinet. In the present invention, since the molten synthetic resin is injected into a portion of the cavity for forming an upper portion of said cabinet through the single tunnel gate, it is possible to form a cabinet for an image display device with a front frame panel and a cabinet portion integrated with each other, in such a manner that a weld line may generate only at the bottom wall of the cabinet. In the event of excessive injecting of the synthetic resin containing the blowing agent into the core layer so that the injection pressure undesirably rises to cause a puncture of the synthetic resin, the puncture is caused only at the bottom wall of the cabinet which is usually invisible, thus avoiding difficult post-processing such as a surface treatment.

In general, molding of a front cabinet having a front frame panel and a cabinet portion may encounter a large resistance against the flow of the molten synthetic resin, if the cavity portion for forming the front frame panel and the cavity portion for forming the cabinet portion are orthogonally connected to each other. A mold employing a single tunnel gate having a circular cross-section of 4 mm to 5 mm in diameter, therefore, involves the risk that the molten synthetic resin may fail to completely fill the cavity. In contrast, in the mold according to the present invention, a smooth flow of the molten synthetic resin is ensured by virtue of the use of the film-type tunnel gate, so that a thick-walled front cabinet having the expected form can be produced securely.

Furthermore, in the method according to the present invention for forming a thick-walled front cabinet, a cavity of a large depth is designed to have a reduced thickness at at least a portion for forming an edge of the front frame panel contactable with the front face of the cathode ray tube. In addition, the injection molding is executed by means of a sandwich injection molding machine in such a manner that the first molten synthetic resin alone is first injected, and then the second molten synthetic resin containing the blowing agent is injected. Consequently, the thick-walled portion of the molded cabinet has a sandwich structure with a core layer containing the blowing agent, thus having a large rigidity, while the thin-walled portion contactable with the front face of the cathode ray tube has a flexibility which is large enough to allow the thin-walled portion to securely contact the front face of the cathode ray tube.

The above and other objects, features and advantages of the present invention will become clear from the following description of the preferred embodiments in conjunction with the accompanying drawings.

DESCRIPTION OF THE PREFERRED EMBODIMENTS

Figure 1:
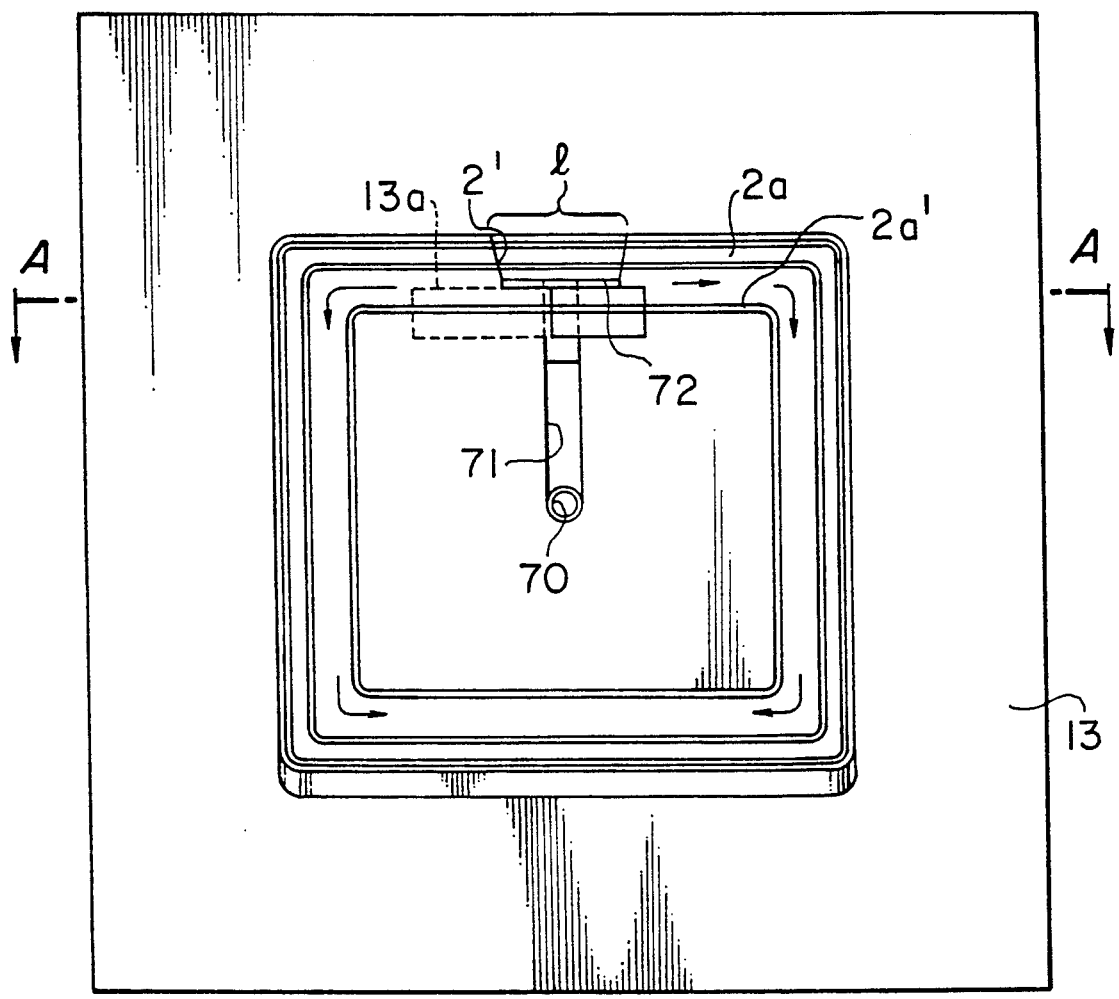
FIG. 1 is a front elevational view of a movable mold part which is a part of a mold in accordance with a first embodiment of the present invention.

A mold in accordance with the present invention will be described with reference to FIGS. 1 to 5.

A stationary mold part 12 is formed with a sprue 70. A runner 71 defined between the stationary mold part 12 and a movable mold part 13 communicates with the sprue 70. A tunnel gate 7 formed in the movable mold part 13 communicates with the runner 71. A tunnel gate 7 is a film gate which communicates with a cavity 2 defined between the stationary mold part 12 and the movable mold part 13. The cavity 2 has a configuration for forming a thick-walled front cabinet 6 for a television set which has a front frame panel 4 and a cabinet portion 5 integral with each other (see FIG. 5). The cavity 2 has a front frame panel forming portion 2a and a cabinet portion forming portion 2b which communicate with each other. In order to obtain a thick-walled cabinet 6 having a large wall thickness of 6 mm, the cavity 2 has a large width W. The width W is selected to be slightly greater than the wall thickness of the cabinet which is 6 mm. The term "thick-walled cabinet" is used to generally mean a cabinet having a wall thickness ranging between 5 mm and 8 mm. A front cabinet to which the present invention pertains is a thick-walled cabinet the thickness of which is locally reduced to 2.5 mm to 3 mm at the edge 4a of the front frame panel 4 at which the cabinet 6 contacts the front face of a cathode ray tube (not shown). A portion 2a' of the cavity 2 for forming the above-mentioned edge 4a of the front frame panel 4, therefore, has a small width w. The width w is selected to be slightly greater than 3 mm.

Figure 2:
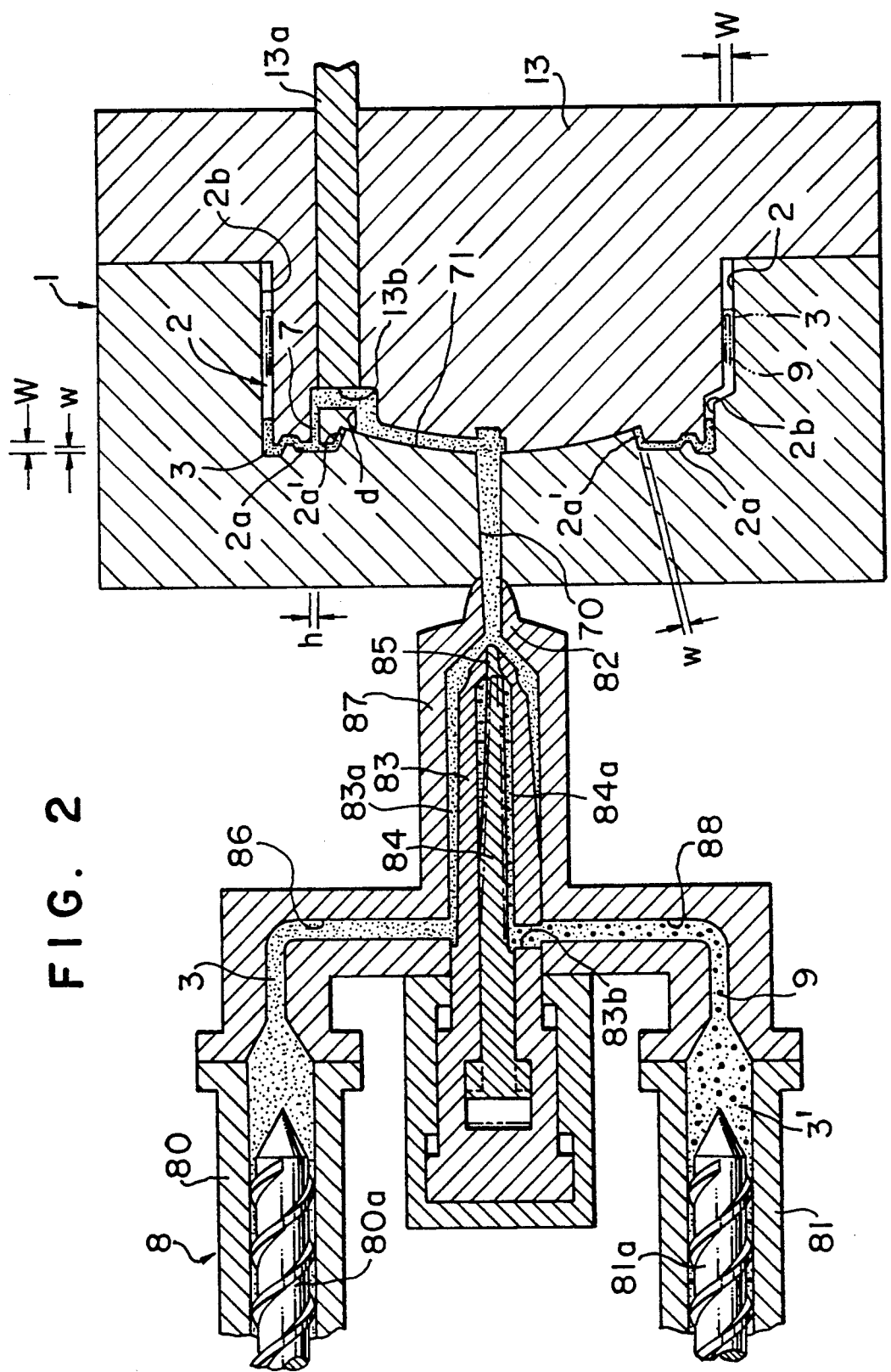
FIG. 2 is an illustration of a method in accordance with the first embodiment.
Figure 3:
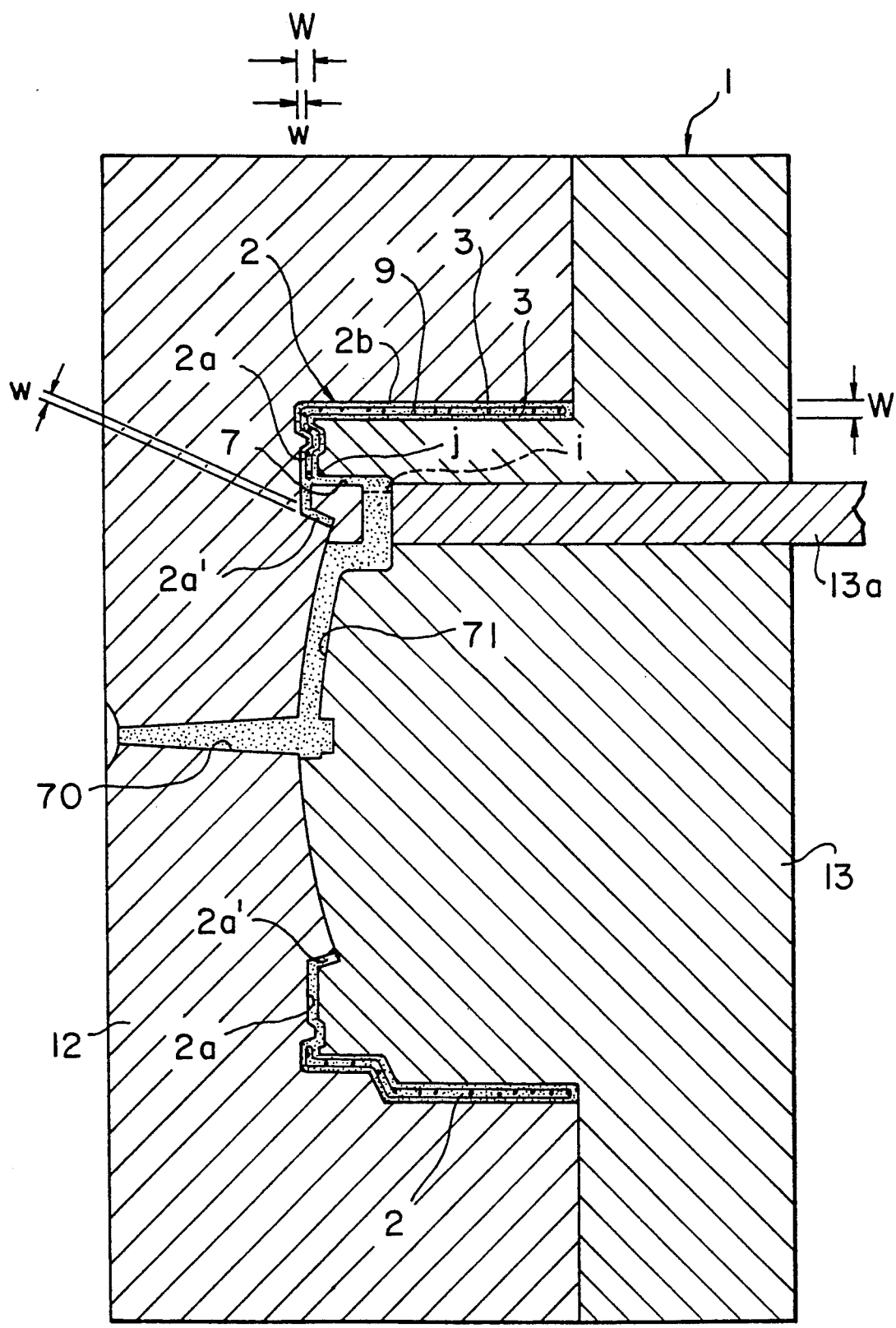
FIG. 3 is an enlarged longitudinal sectional view of a mold shown in FIG. 1 in accordance with the first embodiment.

More specifically, the front frame panel forming portion 2a of the cavity 2 has a large depth corresponding to the width W at a region indicated by reference character 1 in FIG. 1, i.e., at a region 2' which is slightly longer than the width of the end 72 of the film-type tunnel gate 7 and above the end 72, and has a small depth corresponding to the width w at another region of the front frame panel forming portion 2a including the above-mentioned portion 2a' (see FIGS. 1, 2 and 3). Thus, a mold in accordance with the invention essentially requires that at least the portion 2a' for forming the edge 4a contactable with the front face of the cathode ray tube has a small depth, and no restriction is posed for another region of the front frame panel forming portion 2a.

Only one tunnel gate 7 and only one runner 71 are used for a pair of mold parts, said tunnel gate 7 communicating with an upper portion of the cavity 2. More specifically, the tunnel gate 7 communicates with the front frame panel forming portion 2a of the cavity 2.

Figure 4:
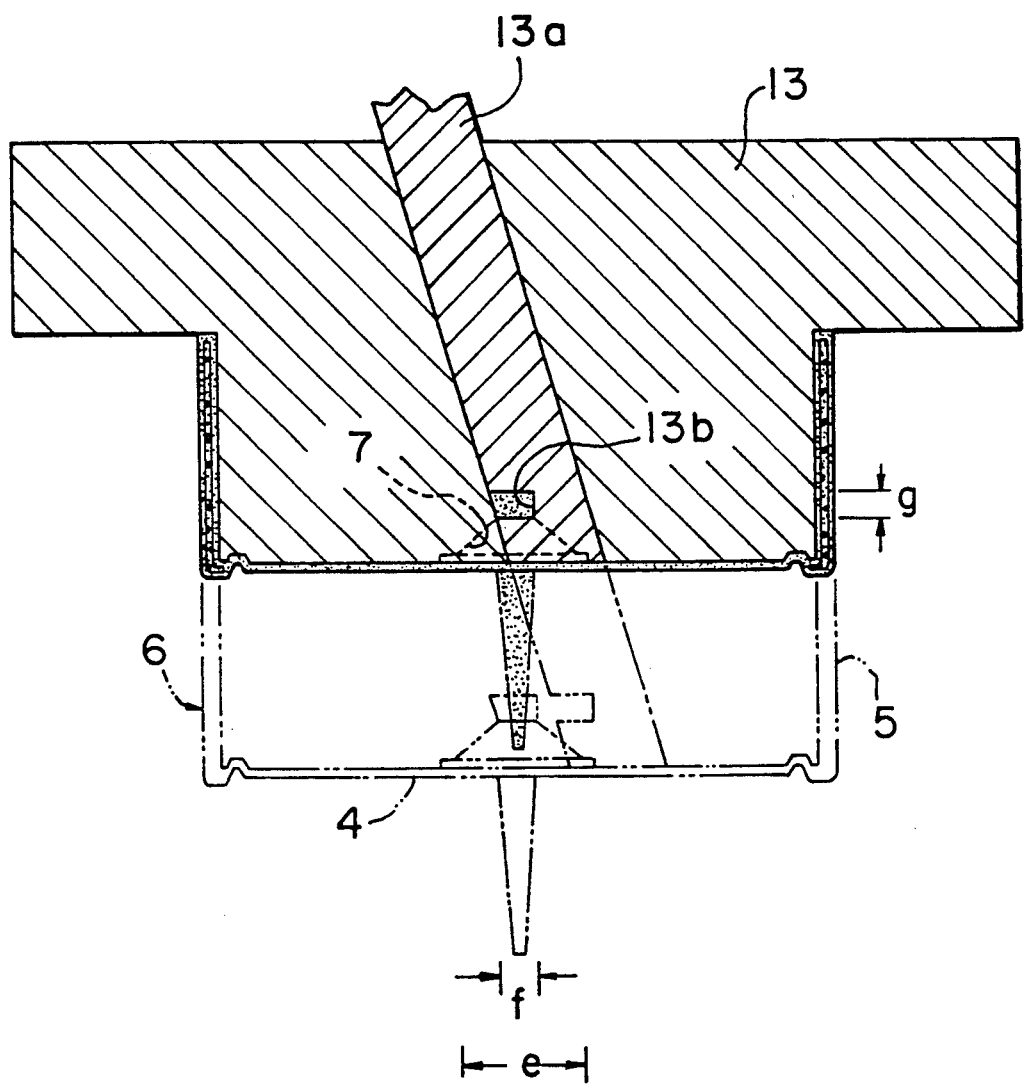
FIG. 4 is a sectional view taken along the line A-A of FIG. 1.
Figure 5:
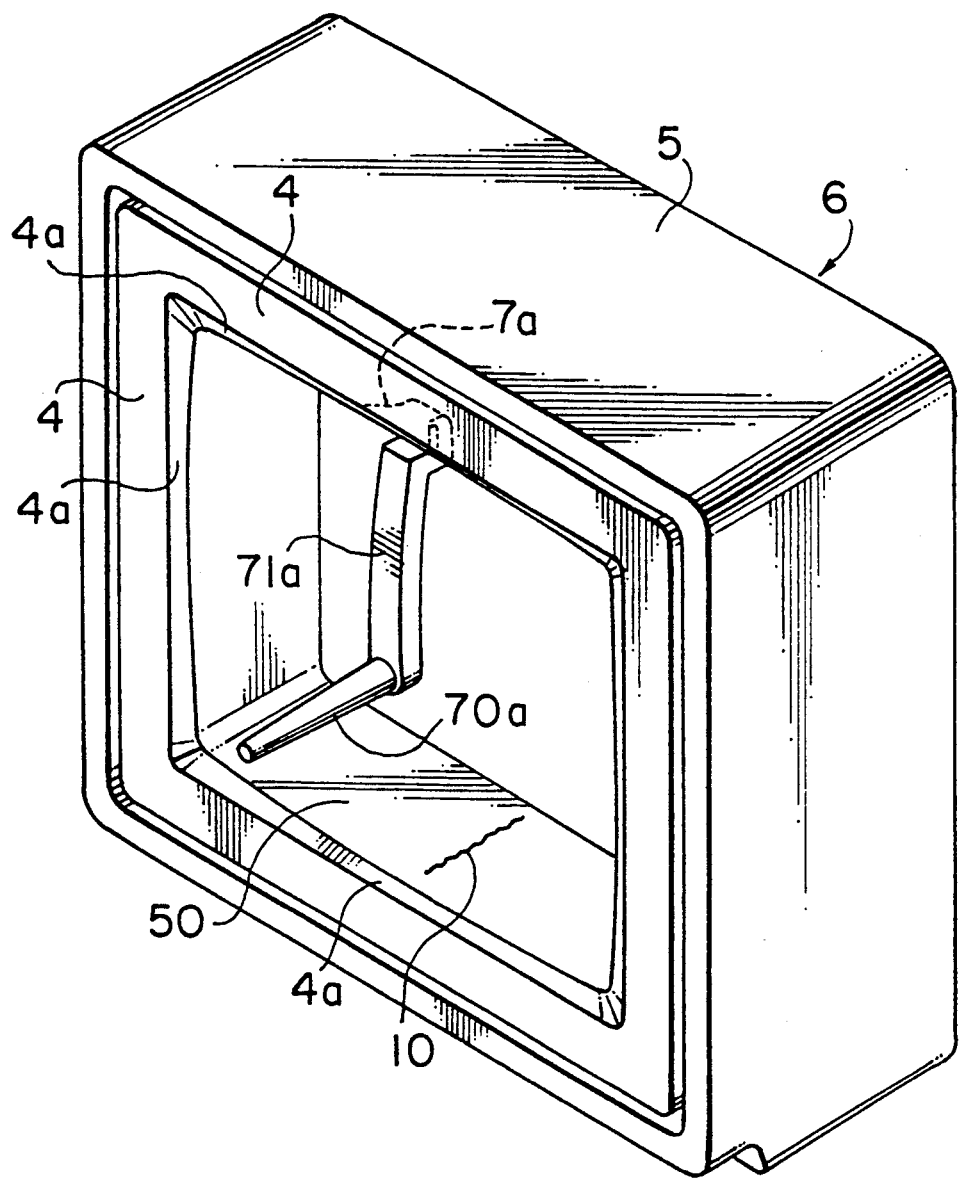
FIG. 5 is a perspective view of a front cabinet formed in accordance with a method of the first embodiment.
Figure 6:
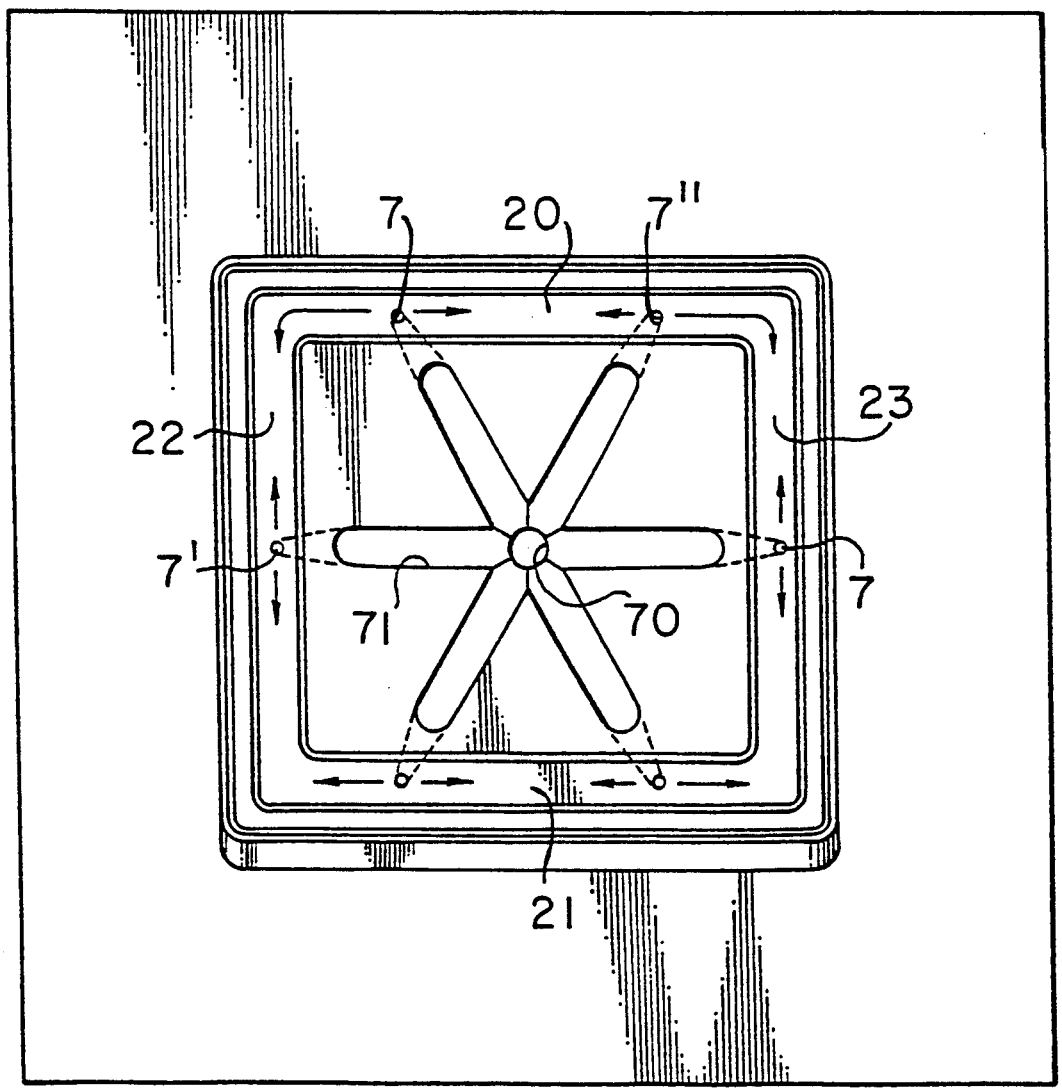
FIG. 6 is a front elevational view of a movable mold part which is a part of a mold in accordance with the prior art.
Figure 7:
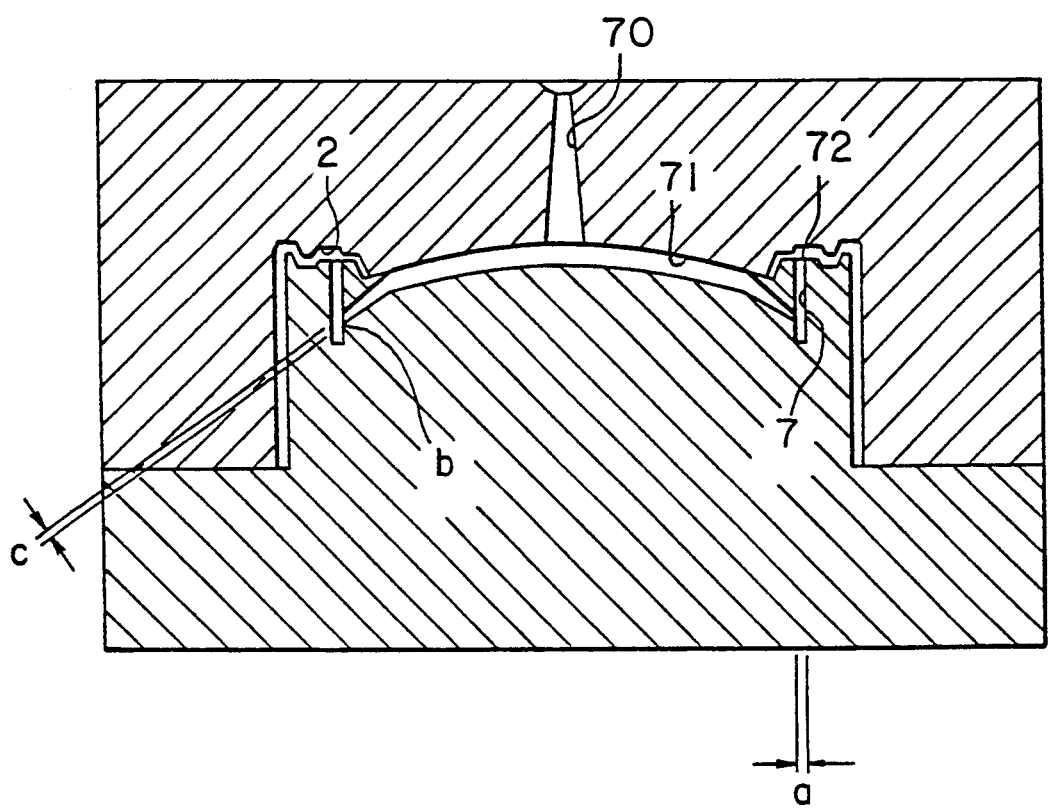
FIG. 7 is a horizontal sectionl view of a stationary mold part and a movable mold part of a mold in accordance with the prior art.
Figure 8:
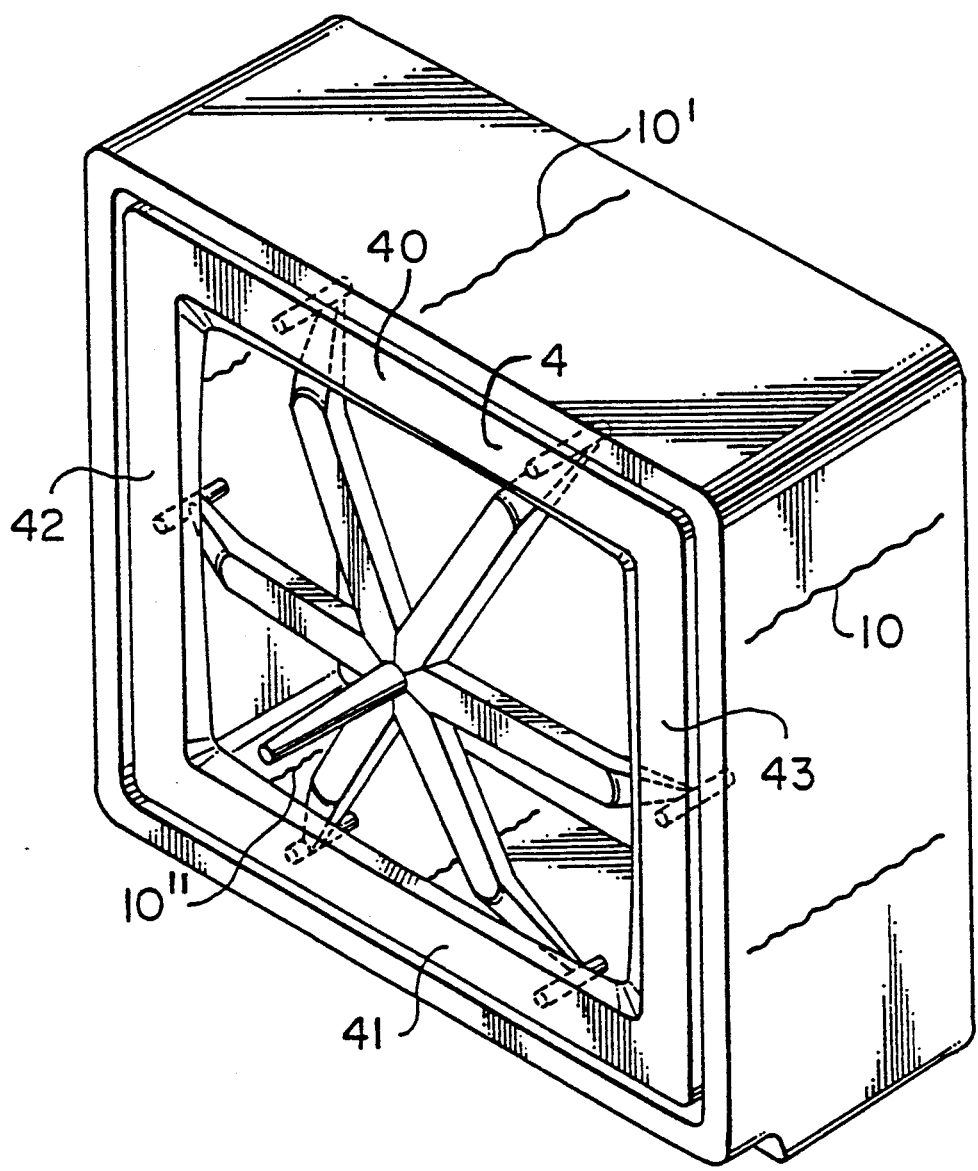
FIG. 8 is a perspective view of a front cabinet formed in accordance with a method in accordance with the prior art.

As shown in FIGS. 2 to 4 an under-cut portion d is provided by an end of a diagonally-arranged ejector pin 13a. The ejector pin 13a has a notch or groove 13b, and slidably extends through the movable mold part 13. In FIG. 4, the size e of the tunnel gate 7 ranges between 50 mm and 60 mm, while in FIG. 4, the sizes f and g range from 12 mm to 14 mm and from 10 mm to 12 mm, respectively.

A description will be given hereinafter of a sandwich injection molding machine 8 for use in carrying out the present invention with reference to FIG. 2.

This sandwich injection molding machine 8 is a known machine which has a first cylinder 80, a second cylinder 81 and a common body 87. The first cylinder 80 has a rotatable screw plunger 80a therein, the rotation of which causes first synthetic resin 3 to be injected through a passage 86. Similarly, the second cylinder 81 has a rotatable screw plunger 81a therein, the rotation of which causes second synthetic resin 3' to be injected through a passage 88. The second synthetic resin 3' has a blowing agent 31 therein.

The common body 87 has an injection valve 82 formed at the end thereof which communicates with the sprue 70 of the stationary mold 12. The common body 87 has a first plunger 83 therein which is arranged to be longitudinally moved to open or close the valve 82 of the common body 87. A chamber 83a formed between the first plunger 83 and the common body 87 communicates with the first cylinder 80 through the passage 86. The first plunger 83 has an end opening 85 formed at the end thereof which communicates with the chamber 83a. The first plunger 83 has a second plunger 84 therein which is arranged to be longitudinally moved to open or close the end opening 85 of the first plunger 83. A chamber 84a formed between the second plunger 84 and the first plunger 83 communicates with the second cylinder 81 through a hole 83b of the first plunger 83 and the passage 88.

A method in accordance with the invention can be carried out by using the mold 1 in combination with the sandwich injection molding machine 8.

In operation, the first plunger 83 is moved to the left as viewed in a solid line in FIG. 2 so as to open the injection valve 82, and the molten first synthetic resin 3, which is in this case molten polystyrene (heated to 220° C. to 230° C.), is injected from the first cylinder 80 into the cavity 2 of the mold 1 through the passage 86, the body 87, the sprue 70, the runner 71 and the tunnel gate 7. The mold 1 is maintained at a temperature which ranges between 30° C. and 40° C. The molten first synthetic resin 3 is charged into a part of the front frame panel forming portion 2a and a part of the cabinet portion forming portion 2b of the cavity 2 as shown in FIG. 2. A portion of the molten first synthetic resin 3 which has been charged into the small depth portion 2a' is rapidly cooled, while the portion of the molten first synthetic resin 3 which has been charged into the large depth portion of the cavity 2 is still in a fluid condition.

After an elapse of a predetermined time which is typically 1.2 to 2.0 seconds, the second plunger 84 is moved to the left as shown in a chain line in FIG. 2 so as to open the end opening 85 of the first plunger 83, and the molten second synthetic resin 3', which is in this case polystyrene heated to 200° C. to 220° C.) containing a blowing agent 9 therein which may be azodicarbonamide, is injected from the second cylinder 81. At this time, the first cylinder 80 is maintained in its operational state, and the injection valve 82 is maintained in its open state so that the first synthetic resin 3 (polystyrene) from the first cylinder 80 also is injected so that the second synthetic resin 3' (polystyrene) containing the blowing agent 9 is introduced into the large depth portion of the cavity 2 while forcibly spreading the first synthetic resin 3 (polystyrene) already supplied from the first cylinder 80, as illustrated in a chain line in FIG. 2. Then, the second plunger 84 is moved to the right as viewed in FIG. 2 to close the end opening 85 of the first plunger 83 so as to allow the first synthetic resin 3 (polystyrene) to be alone supplied from the first cylinder 80. Subsequently, the first plunger 83 is moved to the right as viewed in FIG. 2 so as to close the injection valve 82, thus completing the injection.

In consequence, the small depth portion 2a' for forming the edge 4a of the front frame panel 4 of the cabinet 6 contactable with the front face of the cathode ray tube is filled with the first synthetic resin 3 (polystyrene) which does not contain a blowing agent, whereas, in the large depth portion of the cavity 2, a core layer is formed by the second synthetic resin 3' (polystyrene) containing the blowing agent 9, and the first synthetic resin 3 (polystyrene) from the first cylinder 80 alone forms a skin layer around the core.

During execution of the injection molding, the molten synthetic resin flows as indicated by arrows in FIG. 1 so that a thick-walled front cabinet 6 is formed. Since the tunnel gate 7 is in the form of a film gate and has a large width e (see FIG. 4), the molten synthetic resin is allowed to smoothly flow in a spreading manner into the cavity 2.

Since the cavity 2 has a width W which is as large as 6 mm, there is no risk for the molten synthetic resin to become solidified before completely filling the cavity 2. In addition, since the molten synthetic resin is injected only through the single tunnel gate 7, the molded front cabinet 6 may have only one weld line which generates on the center of the bottom plate 50 thereof. Furthermore, since the tunnel gate 7 is in the form of a film gate, a smooth flow of the molten synthetic resin is ensured, if the portions 2a and 2b of the cavity 2 meet each other at a right angle (see FIG. 2).

After removing of the movable mold part 13 from the stationary mold part 12, the ejector pin 13a is projected as shown in a chain line in FIG. 4 so that the ejector pin 13a slides obliquely. In consequence, the notch 13b of the ejector pin 13a comes off the solidified synthetic resin, whereby the under-cut portion is removed. In the drawings, numerals 70a, 71a and 7a denote portions of the synthetic resin solidified in the sprue 70, the tunnel runner 71 and the tunnel gate 7, respectively, which are removable by a post processing, i.e., by cutting a portion i or j (see FIG. 3) by means of a nipper.

The invention has thus been shown and described with reference to a specific embodiment. However, it should be noted that the invention is in no way limited to the details of the illustrated structures but that changes and modifications may be made without departing from the scope of the appended claims.

I claim:

1. A method of injecting molten synthetic resin into a mold to form a thick-walled front cabinet which has a front frame panel and a cabinet portion integral with each other and which is used for an image display device containing a cathode ray tube therein, comprising the steps of:

(a) providing an injection mold defining a cavity composed of a large depth portion of a first volume for forming a thick-walled portion of the front frame panel and the cabinet portion, and a reduced depth portion of a second volume for forming at least an edge of the front frame panel contactable with the cathode ray tube, the second volume being smaller than said first volume;

(b) providing a sandwich injection molding machine having a first cylinder for injecting a first molten synthetic resin, and a second cylinder for injecting a second molten synthetic resin containing a blowing agent;

(c) injecting, by actuating the first cylinder, the first molten synthetic resin into the cavity at an injection location in the vicinity of a junction between the large depth portion and the reduced depth portion of a front frame panel forming portion of said mold cavity, and continuing to inject the first molten synthetic resin until the second volume is completely filled, while a portion of the first volume not adjacent to said injection location remains unfilled; and (d) after completion of step (c), injecting at the injection location (i) the first and second molten synthetic resin with the second molten synthetic resin surrounded by the first molten synthetic resin by actuating the first and second cylinders, and (ii) then the first molten synthetic resin by actuating the first cylinder, and continuing injecting step (ii) until the large depth portion is filled with the first and second molten synthetic resin;

whereby said at least an edge of the front frame panel of the front cabinet is formed with only the first molten synthetic resin, and other portions of the front cabinet are formed with the first and second molten synthetic resin.

2. A method according to claim 1, wherein said first and second molten synthetic resins are injected into the cavity through only one film-type tunnel gate.

3. A method according to claim 2, wherein said film-type tunnel gate communicates with a portion of the cavity for forming an upper portion of the cabinet.

4. A method according to claim 2, wherein said film-type tunnel gate communicates with a connection between the large and reduced depth portions of the cavity.

5. A method according to claim 3, wherein said tunnel gate communicates with a portion of the cavity for forming an upper portion of the front frame panel of the cabinet.

* * * * *